(12) United States Patent
Schuelke et al.

(10) Patent No.: US 12,391,583 B2
(45) Date of Patent: Aug. 19, 2025

(54) ELECTRODE APPARATUS FOR REMOVING CONTAMINANTS FROM A FLUID

(71) Applicants: Board of Trustees of Michigan State University, East Lansing, MI (US); Fraunhofer USA, Plymouth, MI (US)

(72) Inventors: Thomas Schuelke, Pinckney, MI (US); Mary K. Ensch, Belleville, MI (US); Michael Becker, East Lansing, MI (US); Cory A. Rusinek, Las Vegas, NV (US)

(73) Assignees: Board of Trustees of Michigan State University, East Lansing, MI (US); Fraunhofer USA, Plymouth, MI (US)

( * ) Notice: Subject to any disclaimer, the term of this patent is extended or adjusted under 35 U.S.C. 154(b) by 1164 days.

(21) Appl. No.: 17/229,365

(22) Filed: Apr. 13, 2021

(65) Prior Publication Data

US 2021/0323848 A1 Oct. 21, 2021

Related U.S. Application Data

(60) Provisional application No. 63/011,335, filed on Apr. 17, 2020.

(51) Int. Cl.
*C02F 1/461* (2023.01)

(52) U.S. Cl.
CPC .............. *C02F 1/46109* (2013.01); *C02F 2001/46147* (2013.01); *C02F 2209/02* (2013.01);
(Continued)

(58) Field of Classification Search
CPC ........ C02F 1/46109; C02F 2001/46147; C02F 2209/02; C02F 2209/05; C02F 2209/06; C02F 2209/40
See application file for complete search history.

(56) References Cited

U.S. PATENT DOCUMENTS

2018/0099881 A1\* 4/2018 Fryda .................... C02F 1/4672
2020/0399147 A1 12/2020 Yost et al.

FOREIGN PATENT DOCUMENTS

WO WO-2020/172132 A1 8/2020

OTHER PUBLICATIONS

Schaefer, C.E., et al., "Electrochemical treatment of perfluorooctanoic acid and perfluorooctane sulfonate: insights into mechanisms and application to groundwater treatment," Chemical Engineering Journal, 317 (Feb. 21, 2017), pp. 424-432.

(Continued)

*Primary Examiner* — Zulmariam Mendez
(74) *Attorney, Agent, or Firm* — Harness, Dickey & Pierce, PLC (57) ABSTRACT

An electrode apparatus for removing contaminants from a fluid is provided. In another aspect, an electrochemical destruction apparatus for wastewater effluent using Boron-doped diamond electrodes is employed. A further aspect of the present apparatus includes a fluid-carrying conduit, electrodes located within the conduit, an electrical controller connected to the electrodes, a sensor connected to the controller being adapted to sense a chemical characteristic associated with contaminants in the fluid, and the controller automatically varying an electrical characteristic associated with at least one of the electrodes based, at least in part, on an input from the sensor. Yet another aspect includes a programmable controller and software which automatically employ a feedback control loop to increase or decrease electrical current density to contaminant-removing electrodes.

26 Claims, 10 Drawing Sheets

(52) U.S. Cl.
CPC ...... *C02F 2209/05* (2013.01); *C02F 2209/06* (2013.01); *C02F 2209/40* (2013.01)

(56) References Cited

OTHER PUBLICATIONS

Carter, K.E., et al., "Oxidative destruction of perfluorooctane sulfonate using boron-doped diamond film electrodes," Environmental Science Technology, 42 (2008), pp. 6111-6115.

Schafer, C.E., et al., "Electrochemical Transformations of Perfluoroalkyl Acid (PFAA) Precursors and PFAAs in Groundwater Impacted with Aqueous Film Forming Foams," Environmental Science & Technology (2018).

Nassazzi, W., "Removal of poly- and perfluoroalkyl substances from water using the BDD electrode," Swedish University of Agricultural Sciences, Master's Thesis in Environmental Science (2018).

Quiroz, M. et al., "Boron Doped Diamond Electrode for the Wastewater Treatment," Journal of the Brazilian Chemical Society (Mar. 2006).

Freitas, J.M., et al., "Boron Doped Diamond Electrodes in Flow Based Systems," Frontiers in Chemistry (Apr. 3, 2019), vol. 7, Article 190.

Ensch, M., et al., "Degradation of Per- and Polyfluoroalkyl Substances at Differing Current Densities Using a Boron-Doped Diamond Electrode Stack," Michigan State University and Fraunhofer USA (public presentation in 2018).

\* cited by examiner

ELECTRODE APPARATUS FOR REMOVING CONTAMINANTS FROM A FLUID

CROSS-REFERENCE TO RELATED APPLICATIONS

The present application claims priority to U.S. provisional patent application Ser. No. 63/011,335 filed on Apr. 17, 2020, which is incorporated by reference herein.

BACKGROUND AND SUMMARY

The present disclosure generally relates to an electrode apparatus and more particularly to an electrode apparatus for removing contaminants from a fluid.

Per- and polyfluoroalkyl substances ("PFAS") are man-made chemicals used in various products. They have hydrophilic and hydrophobic components, and include perfluoroalkyl acids ("PFAA"). This category also includes perfluorocarboxylic acids ("PFCA") and perfluorosulfonic acids ("PFSA"). Perfluorooctanoic acid ("PFOA") is one of the most common PFCAs found in the environment and is of high interest in recent years due to its health effects.

Due to the high stability of PFAS, few processes have been successful at remediation. Traditional destruction methods include thermal, plasma-based water treatment and advanced oxidation. Thermal destruction requires temperatures greater than 1000° C. which undesirably generates greenhouse gasses. Plasma-based water treatment has been attempted with DC discharges and reactors but was found to be inefficient. Laminar jet with bubbling reactors require the use of argon gas and they are still in an experimental stage with uncertain results.

Electrochemical oxidation ("EO") does not involve additional chemicals, gasses, or pH adjustments. EO utilizes direct and indirect oxidation by applying current to electrodes. For remediation, however, high current and voltage are needed which necessitate the use of Boron-doped diamond ("BDD") on the electrodes. BDD can withstand the high current and potential while behaving as a weak absorber of hydroxyl radicals. Thus, the more readily available oxidants can be beneficial in indirect oxidation. Nevertheless, significant energy consumption and the associated expense are needed for these conventional EO processes.

In accordance with the present invention, an electrode apparatus for removing contaminants from a fluid is provided. In another aspect, an electrochemical destruction apparatus for wastewater effluent using Boron-doped diamond electrodes is employed. A further aspect of the present apparatus includes a fluid-carrying conduit, electrodes located within the conduit, an electrical controller connected to the electrodes, a sensor connected to the controller being adapted to sense a chemical characteristic associated with contaminants in the fluid, and the controller automatically varying an electrical characteristic associated with at least one of the electrodes based, at least in part, on an input from the sensor. Yet another aspect includes a programmable controller and software which automatically employ a feedback control loop to increase or decrease electrical current density to contaminant-removing electrodes. A method of using an automated control loop to change electrical supply characteristics to an electrode based, at least in part, on sensed chemical characteristics of a fluid flowing in contact with the electrode, is additionally disclosed.

The present apparatus and method are advantageous over conventional devices. For example, the present apparatus and method require a significantly lower power consumption thereby reducing the operating cost. Furthermore, the present apparatus and method advantageously automatically vary an electrical characteristic of electrodes to remove different types of contaminants depending on a sensor input. Moreover, the present apparatus and method are ideally suited for removing PFAS from wastewater effluent by varying current densities to an anode. Additional advantages and features of the present apparatus and method will become apparent from the following description and appended claims taken in conjunction with the accompanying drawings.

DETAILED DESCRIPTION

Figure 1:
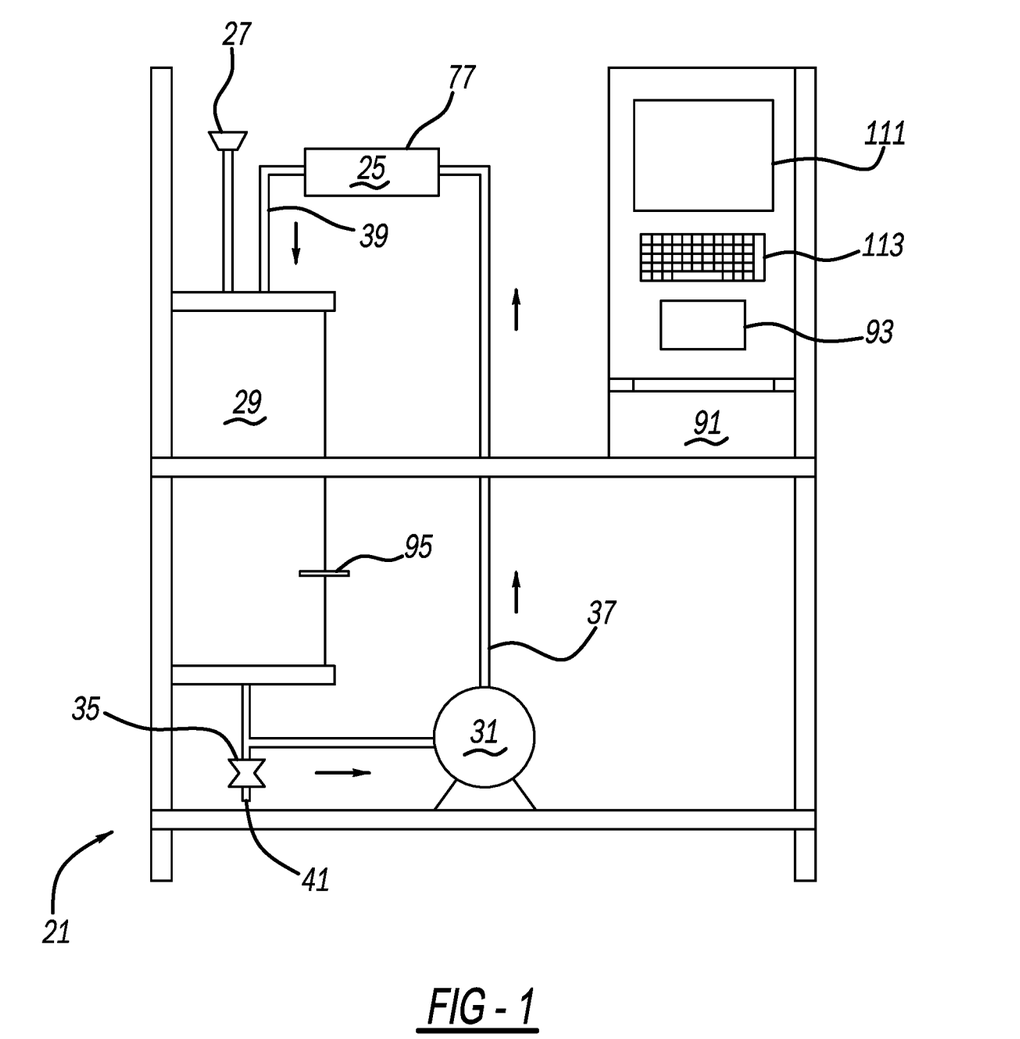
FIG. 1 is a side elevational view showing the present apparatus employed in a fluid treatment system.
Figure 2:
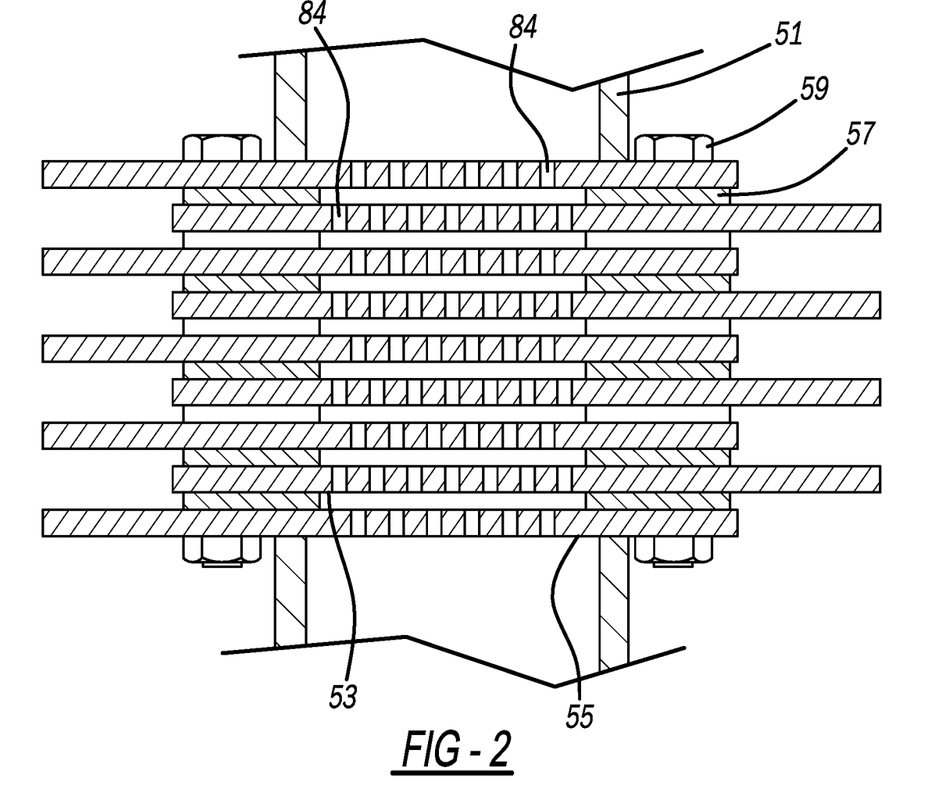
FIG. 2 is a cross-sectional view showing electrodes of the present apparatus.
Figure 3:
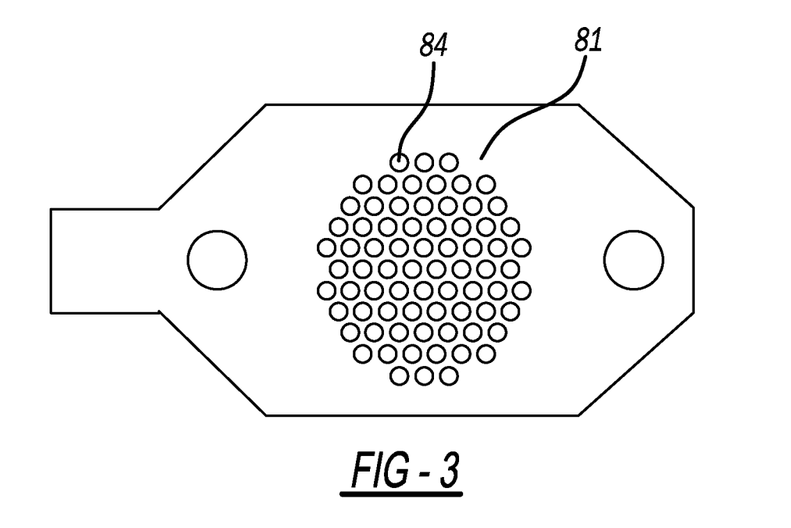
FIG. 3 is a top elevational view showing one of the electrodes of the present apparatus.

An electrode apparatus 21 for removing contaminants from a fluid can be observed in FIGS. 1-3. A preferred embodiment of electrode apparatus 21 includes a pass-through reactor 25 coupled to a plumbing circuit which includes an inlet 27, a holding tank 29, a circulation pump 31, valves 35, an upstream pipe 37, a downstream pipe 39 and an outlet 41. Additionally, recirculation pipes, valves and meters may optionally be employed within the plumbing circuit. A factory or municipal wastewater discharge pipe is coupled to inlet 27 and the present reactor 25 operably removes undesired contaminants from the wastewater fluid flowing therethrough before it is further discharged from outlet 41 into a holding pond, drain, natural waterway or the like. For example, waste liquid may be contaminated ground water.

Pass-through reactor 25 includes a hollow central conduit 51 through which laterally extend and span anode and cathode electrodes 53 and 55, respectively. Conduit 51 can be a single pipe with lateral slots or multiple, coaxially arranged pipes segments. The electrodes are preferably arranged in a sandwich of alternating cathodes and anodes. This alternating cathode-anode-cathode-anode-cathode configuration advantageously provides assembly flexibility and simplicity. Electrically insulating and sealing gasket-like spacers 57 have an annular and hollow configuration, and are clamped between each adjacent pair of electrodes. The electrodes are clamped together by fasteners 59 such as threaded bolts and nuts on each lateral side of conduit 51, which extend through fastener holes in the electrodes. Moreover, stamped sheet metal electrical connectors are fastened to cathodes 55 on one lateral side of the conduit, while a similar electrical connector is fastened to each anode 53 on the opposite lateral side of the conduit. Threaded bolt and nut fasteners may be employed although it is also envisioned that solder or rivet fasteners may alternately be used to secure the connectors to projecting tails of the electrodes. To condense the packaging of the stacked sets of electrodes, alternating electrodes may be arranged laterally perpendicular to the adjacent ones such that their projecting tails are 90° offset between each adjacent electrode depending on the peripheral shapes of the electrodes.

This arrangement, after being electrically connected to an electrical circuit, is covered within an outer housing 77. Alternately, sets or groupings of three adjacent electrodes may be arranged in a sandwich of one upper cathode and one lower cathode with one anode therebetween, and gaskets are located between each set; this configuration advantageously provides added structural and mechanical stability when many electrodes are used.

As can be seen in FIGS. 2 and 3, each electrode 53 and 55 has a middle section 81 with a polygonal or alternately, arcuate, periphery. A series of hexagonally arranged through-holes 84, preferably at least 7 and more preferably at least 19, are arranged in middle section 81 to allow the waste fluid to flow therethrough. Holes 84 are located between the fastening holes. The holes of anode 53 are laterally offset from those of the adjacent cathodes 55 to create a turbulent flow condition therebetween which improves contaminant removal.

Each electrode 53 and 55 includes a Boron-doped diamond film or coating applied to a base substrate by microwave plasma-assisted chemical vapor deposition or hot filament chemical vapor deposition. The substrate is preferably a metal, such as molybdenum, niobium or tantalum. Alternately, free-standing Boron-doped diamond plates without substrate or electrically conductive silicon material, may be used. This BDD coating adds durability to the electrodes to avoid otherwise more frequent replacement during use and to also avoid the electrodes prematurely oxidizing themselves. The BDD material is ideally suited for a PFAS removing electrode since the diamond bond assists in breaking down the PFAS chemistry at least in part due to the diamond being a good hydroxyl radical promoter. It is also noteworthy that the relatively large surface area on both sides of the middle section of each electrode provides a desirable electrical potential drop between the adjacent spaced-apart electrodes in each set within reactor 25.

Thus, with this electrochemical oxidation technique in combination with the BDD electrodes and the automated control system to be discussed in greater detail hereinafter, mechanical filters are not needed for the PFAS removal. That said, additional chemicals, pH adjustments or filters may optionally be employed for other reasons within the plumbing circuit. It is expected with the present apparatus will significantly reduce energy consumption while effectively removing and even breaking down difficult to handle contaminants such as PFAS from a water supply. It is noteworthy that a central portion of the water flows in a substantially straight and direct path from the conduit (ignoring any incidental conduit surface-induced eddy currents) to an upstream one of the electrodes such that energy wasting aeration, cavitation and/or bubbling are not necessary to remove PFAS contaminants within the preferred example of the present apparatus.

Figure 4:
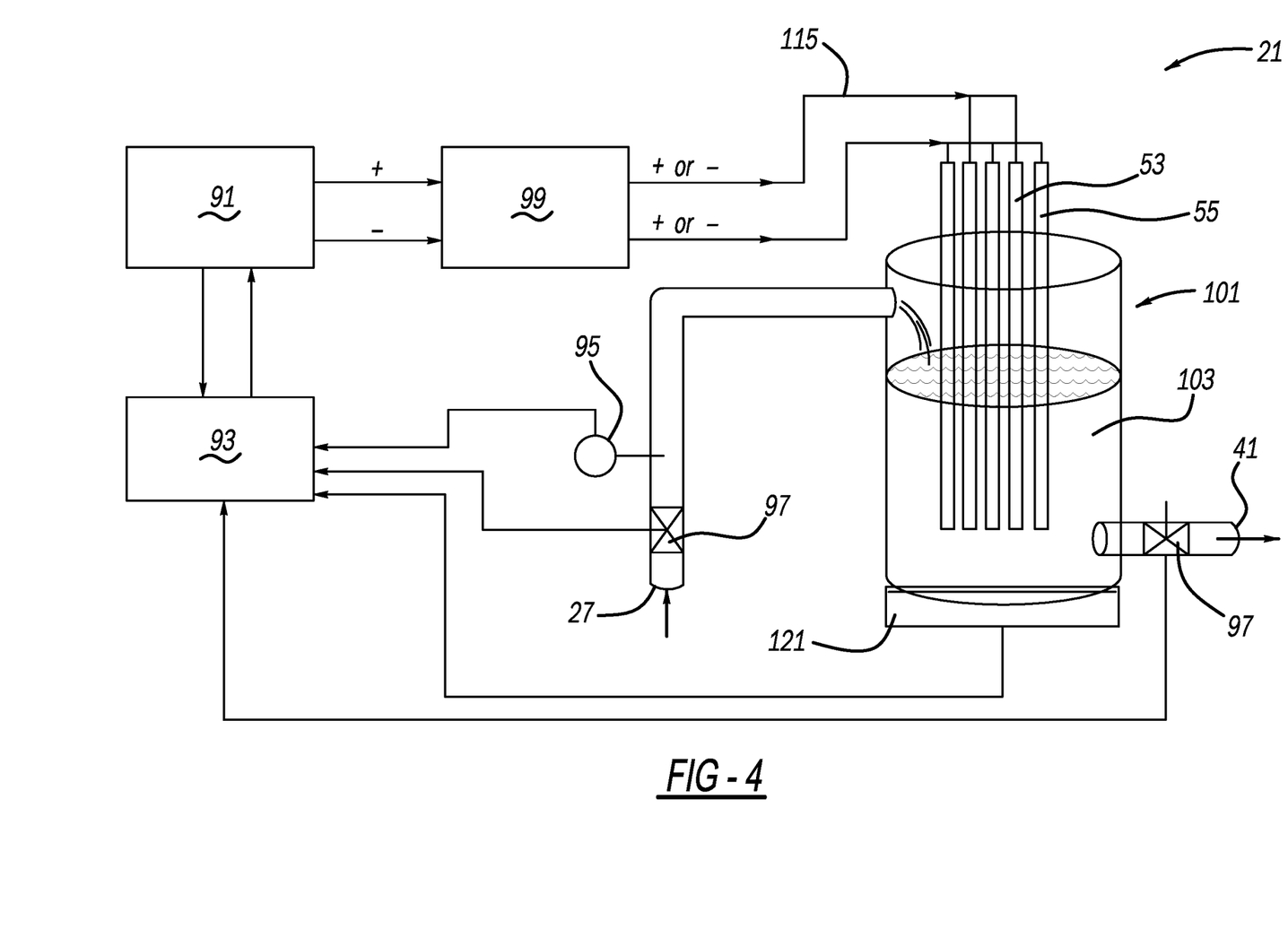
FIG. 4 is an electrical diagram showing an electrical circuit employed with a variation of the present apparatus.

An electrical circuit can be observed with reference to FIGS. 1 and 4. Influent enters inlet 27 while effluent exits outlet 41. An electrical power supply 91 is connected to electrical controller 93, which is in turn, electrically connected to one or more sensors 95 and valves 97. Power supply 91 is also electrically connected to electrical components and a circuit including a relay 99. This supplies electrical power to anodes 53 while cathodes 55 are also electrically connected to relay 99; thereby an electrical potential difference is created between the spaced apart but adjacent electrodes and cathodes. A parallel plate reactor 101 with electrodes 53 and 55, is placed in the fluid in a holding tank or conduit 103 in this alternate embodiment, however, the electrical circuit is applicable to the pass-through reactor as well. The parallel plate reactor 101 is better suited for laboratory or small batch wastewater configurations as compared to the higher volume processed in the pass-through type reactor.

Controller 93 includes a microprocessor, an output display screen 111, a keyboard 113, and an electrical circuit 115. It should be appreciated, however, that other input and output devices such as lights, switches and the like may be used. Controller 93 also includes memory upon which is stored programmable software instructions, in a non-transient form.

Sensor 95 may be a potentiometric measuring device such as a pH probe or electrode. For example, a fluoride ion selective electrode detector can be used. Furthermore, electrical conductivity, temperature and liquid flow rate may optionally be sensed, measured and automatically controlled in a closed loop feedback manner for the fluid passing through the present system.

Figure 8:
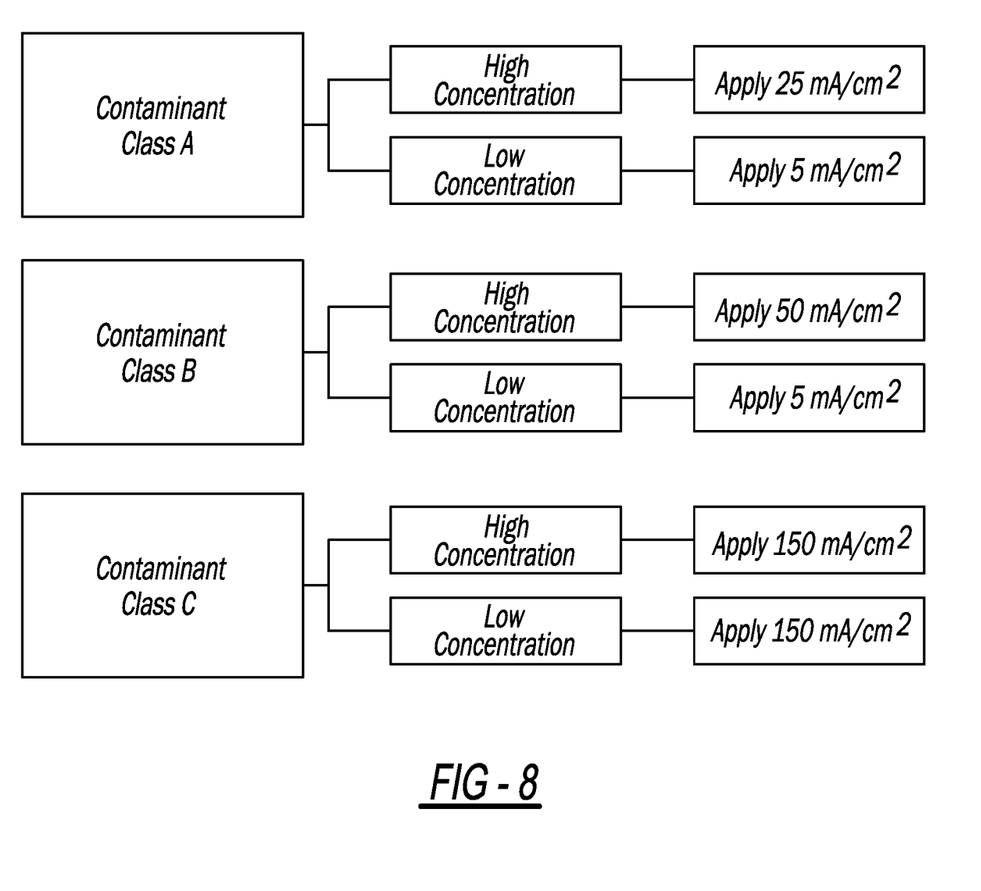
FIG. 8 is a block diagram showing different current density settings depending on different sensed contaminants for the present apparatus.
Figure 9:
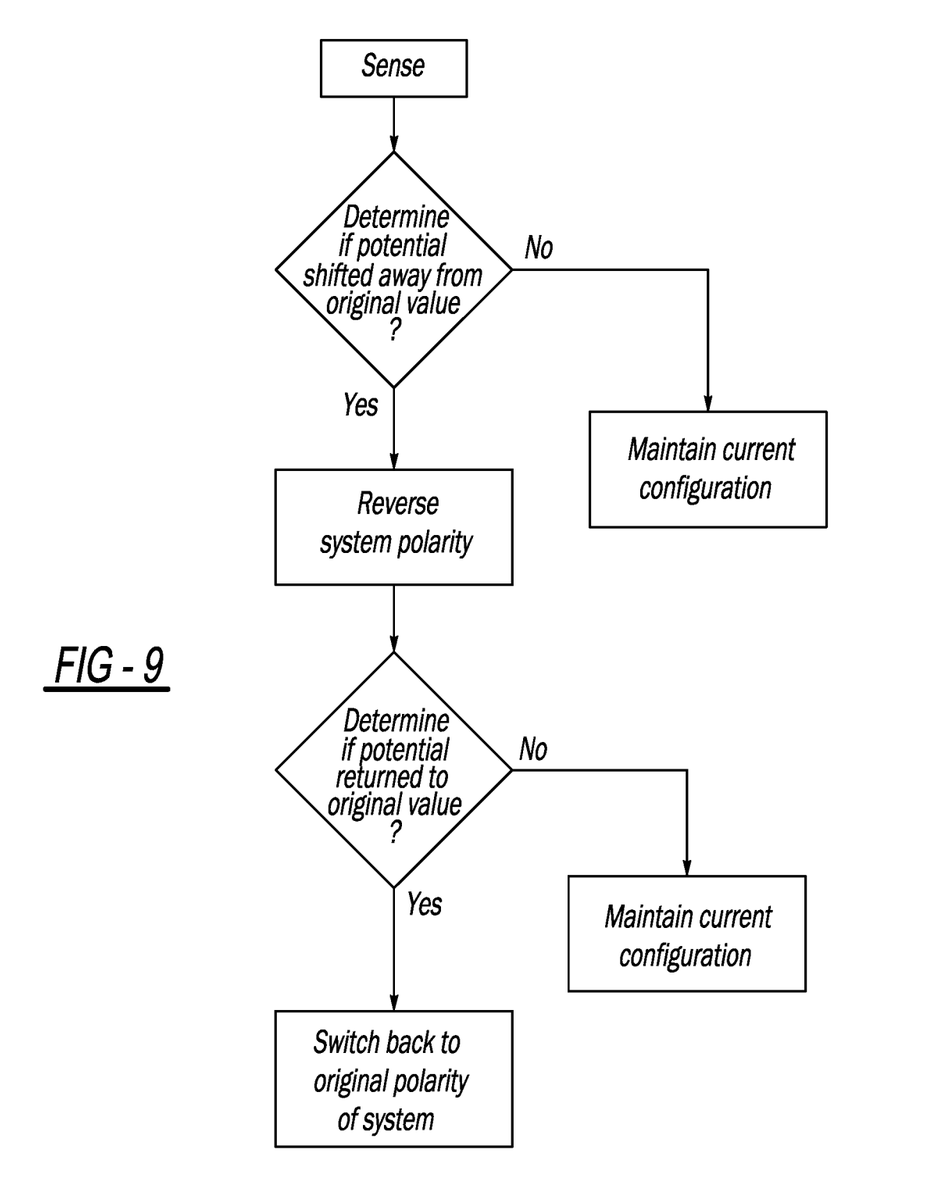
FIG. 9 is a software flow diagram for the present apparatus.

The software instructions and control logic are illustrated in FIGS. 8 and 9. The programmable software instructions and electrical circuit preferably provide an automated feedback control loop which changes electrical current density supplied to the electrodes, and therefore varies the potential between adjacent electrodes based, at least in part, on measured values of contaminants within the fluid flowing in contact with the electrodes. For example, if a contaminant of type or class A with precursor molecules has a unique chemical characteristic sensed or detected by the sensor, then it will automatically vary the current density or other electrical characteristic supplied to the anode, from a first amount to a second amount, and optionally other incremental amounts. Furthermore, if a contaminant of type or class B is sensed or detected, then the software instructions will automatically vary the electrical characteristics supplied to the anodes in a different arrangement. Similarly, if a contaminant of a different type or class C is sensed or detected, then the software instructions will vary or change the electrical characteristic in still a different combination of values.

The following nonlimiting examples set forth one possible automated real-time feedback loop methodology. The control variation for precursor molecules of contaminant A may initially apply a high current density ("CD") and thereafter a low CD, either during a single cycle or providing the higher value in a first cycle and then the lower value in a reused second cycle of the same recycled fluid. The CD can subsequently be further reduced for any additional recycling of the fluid before it is finally discharged. These CD reductions for recycled configurations advantageously reduce the power consumption needs for the second and subsequent cycles. For the contaminant B example which contains long-chain molecules, an even greater CD can be employed at the anodes in a first cycle and then a lower CD may be used for subsequent cycles. And then with exemplary contaminant C which contains short-chain molecules, an even higher CD can be employed for both cycles of the same fluid if attraction of the contaminants to the electrodes and subsequent chemical breakdown of the contaminants by the electrodes requires this larger energy consumption in one or subsequent cycles of the fluid. Thus, the controller varies an electrical characteristic of at least one of the electrodes depending on a concentration and/or species of contamination detected. This multi-tiered automated feedback control is ideally suited where different contaminants may be present within the same wastewater treatment plumbing circuit such as a municipal or industrial wastewater treatment system which may contain PFAS, pharmaceutical chemicals, ammonia, uranine and the like, and the type of contaminant may or may not be present hour-to-hour or day-to-day.

In another example, the controller and software instructions may periodically reverse the polarity between the electrodes after a predetermined number of cycles or after real-time performance detection in the reactor, to flush the reactor and prevent or deter electrode fouling. Moreover, the present controller and software instructions may automatically vary an electrical characteristic, such as current density, to one set of electrodes different than another set of electrodes, within the same reactor based upon real-time sensed measurements of the fluid flowing therethrough.

The present apparatus can alternately be employed for remotely removing PFAS from a drinking water treatment unit when the unit is mostly saturated and then removed from the attached fresh water plumbing. One example of such a treatment unit is disclosed in International Patent Application Serial No. PCT/US20/18585 entitled "Electrode Apparatus for Creating a Non-Uniform Electric Field to Remove Polarized Molecules in a Fluid" which was invented by Fan et al. This PCT application is incorporated by reference herein.

Returning to the alternate construction shown in FIG. 4, the reactor 101 includes Boron-doped diamond on a niobium (Nb) substrate with two anodes 53 and three cathodes 55. The electrode plates are coated with BDD on both sides, are spaced apart by approximately 1-3 mm and an exposed anodic surface area is approximately 105 cm$^2$. Power supply 91 is a 180 W multi-range 60V/8 A DC power supply such as can be obtained from BK Precision Instruments. Analytical grade sodium sulfate ($Na_2SO_4$) can be purchased from J.T. Baker Inc. and is made at 50 mM. Perfluorooctanoic acid, such as that experimentally obtained from Sigma Aldrich, is the exemplary contaminant in a tank or conduit. A fluoride standard from (Sigma Aldrich) is used for calibrating the ion selective electrode. In a laboratory set up, all solutions are stirred with an exemplary Hanna Instruments magnetic stirrer 121 model HI 190M. Furthermore, a pH probe, temperature probe, and fluoride ISE sensors 95 are used, such as can be obtained from Thermofisher Scientific.

An analytical characterization of BDD electrodes 53 and 55 is completed with an exposed surface area of $2.66\times10^{-04}$ cm$^2$. The polycrystalline BDD film preferably has uniform grain sizes of about 4-6 μm in diameter. A Boron concentration of $\sim5\times10^{20}$ cm$^{-3}$ is employed. This allows the diamond film to exhibit semi-metallic conductivity.

Figure 5:
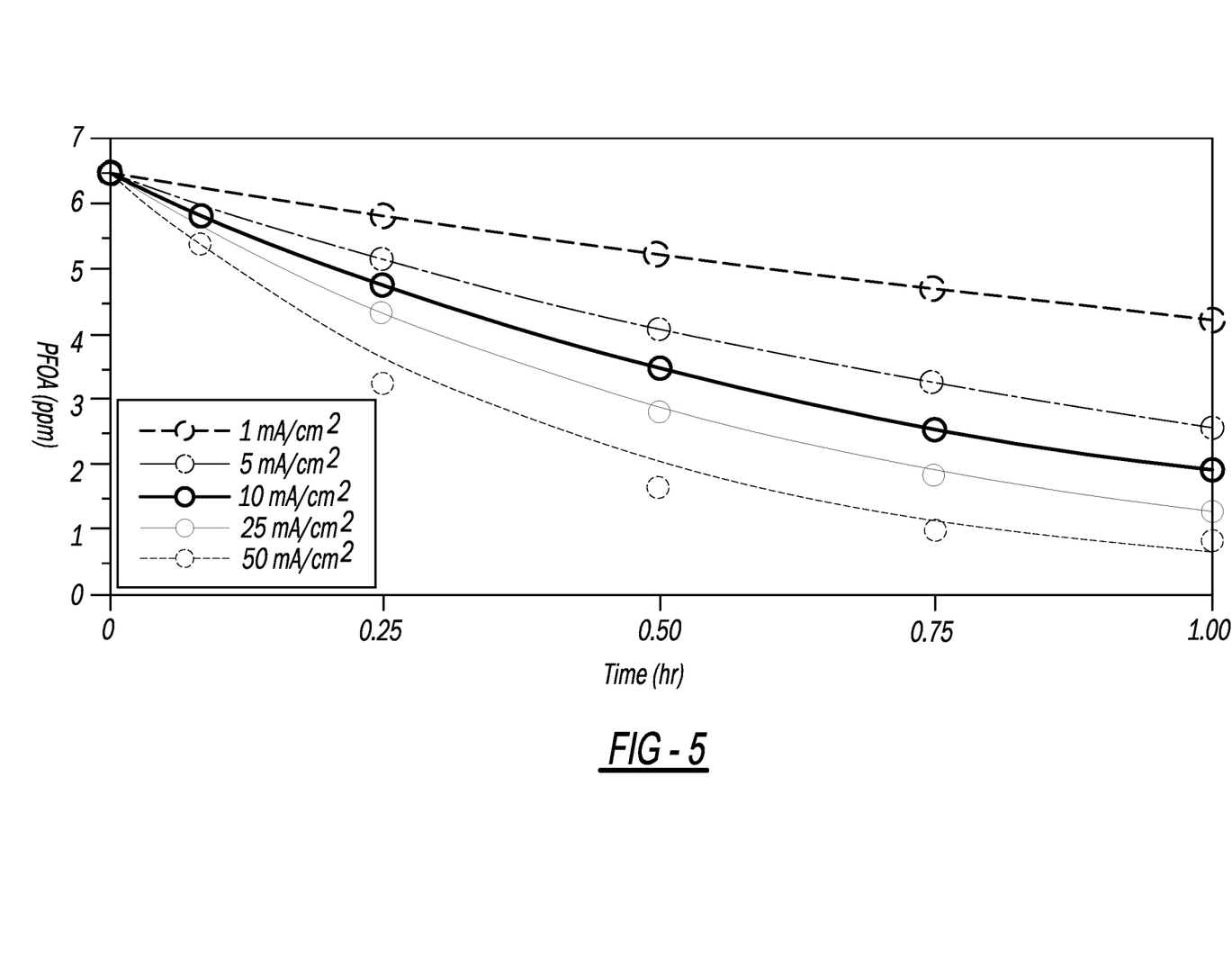
FIG. 5 is a graph showing PFOA degradation at different current densities for the present apparatus.

Referring to FIG. 5, standard current density tests may be done at 1, 5, 10, 25 and 50 mA/cm$^2$. For 1-10 mA/cm$^2$ the total time for each test is 1 hour and samples are taken at the time points of 0, 0.25, 0.5, 0.75, and 1 hour. 25 and 50 mA/cm$^2$ have an additional sample removed at 5 minutes. Combined CD studies may use 50 mA/cm$^2$ for the first 15 minutes followed by 1, 5, or 10 mA/cm$^2$ for the remaining 0.75 hours.

The starting concentration of each PFOA experiment is 6.5 parts per million ("ppm"). Cell voltages span +4 to +9 V. All test volumes start at room temperature and reach a maximum of 40° C. for the highest CD value. For the 1 mA/cm$^2$ trials, the pH remains mostly constant at ~5.0. At higher CDs, tests begin at a pH 5.0 and increase to ~10.5.

Figure 6:
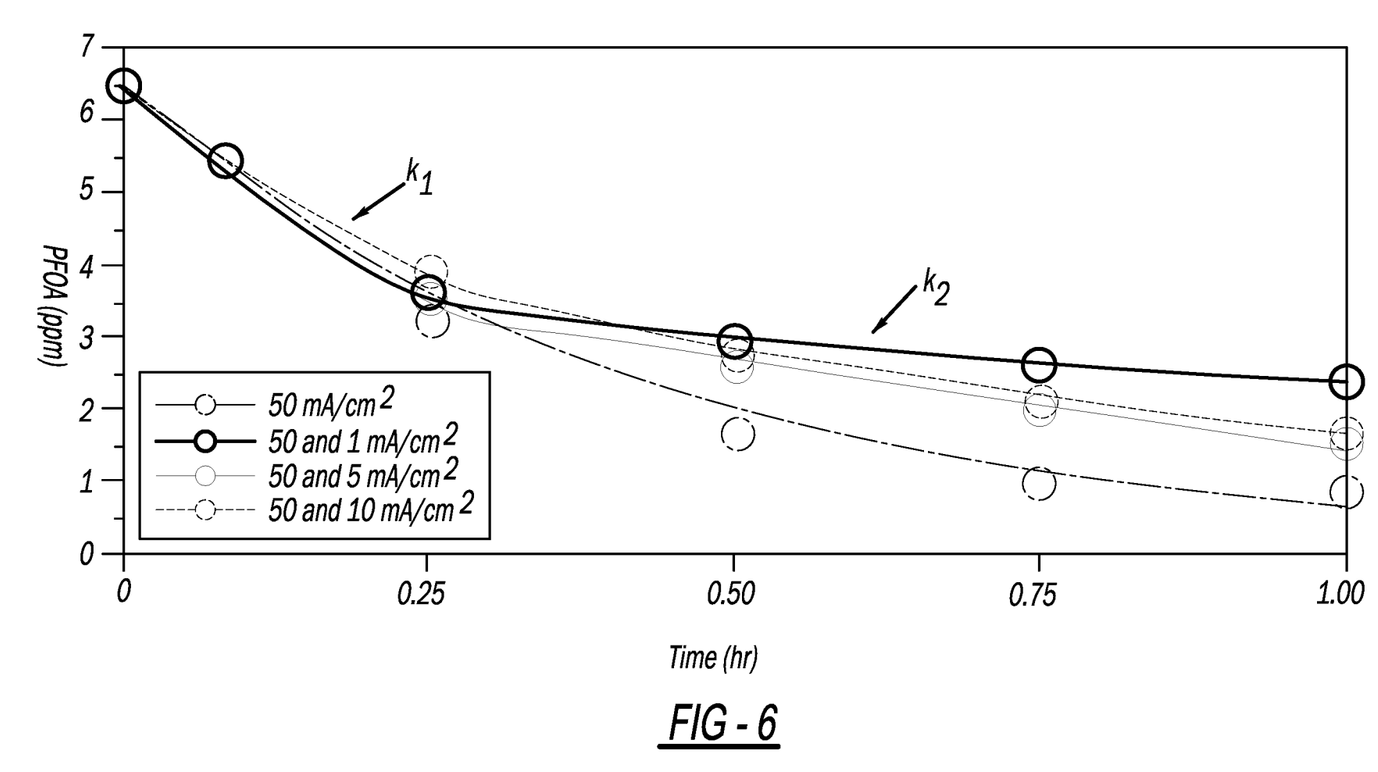
FIG. 6 is a graph showing a concentration of PFOA over time for mixed current densities for the present apparatus.
Figure 7A:
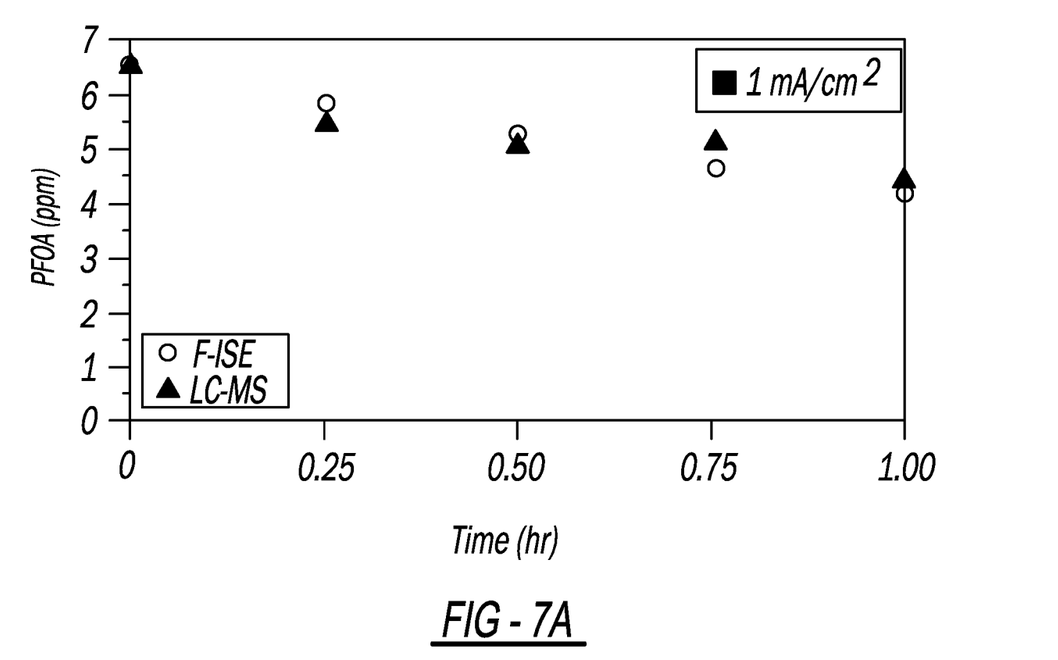
FIGS. 7A-F are graphs showing PFOA concentrations between fluoride ISE measurements and LC-MS for the present apparatus.
Figure 7B:
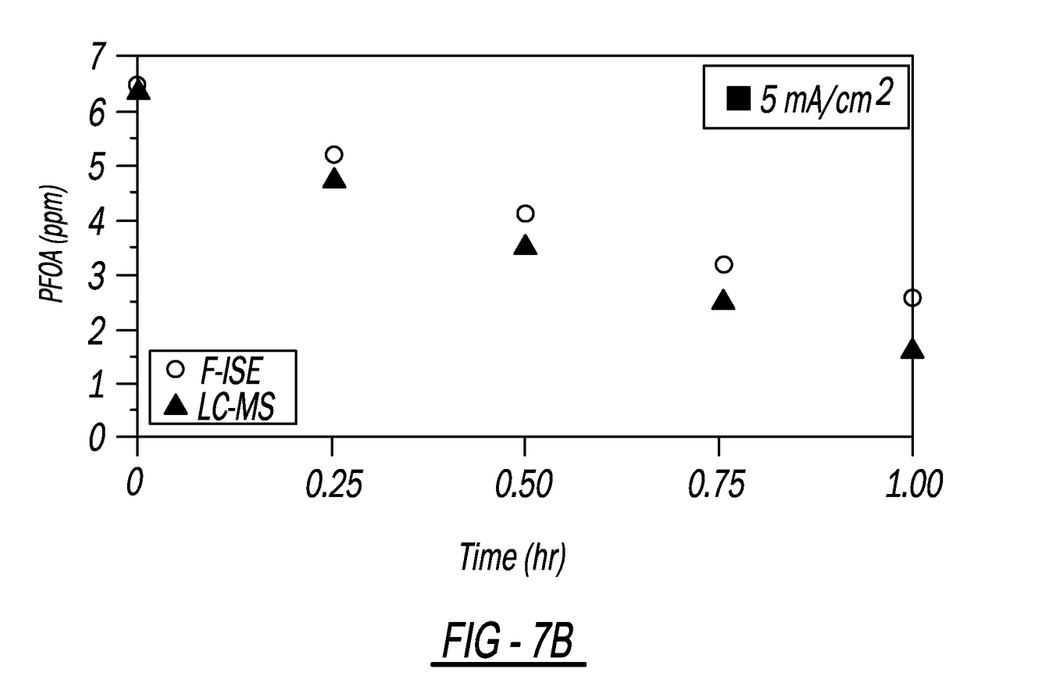
Figure 7C:
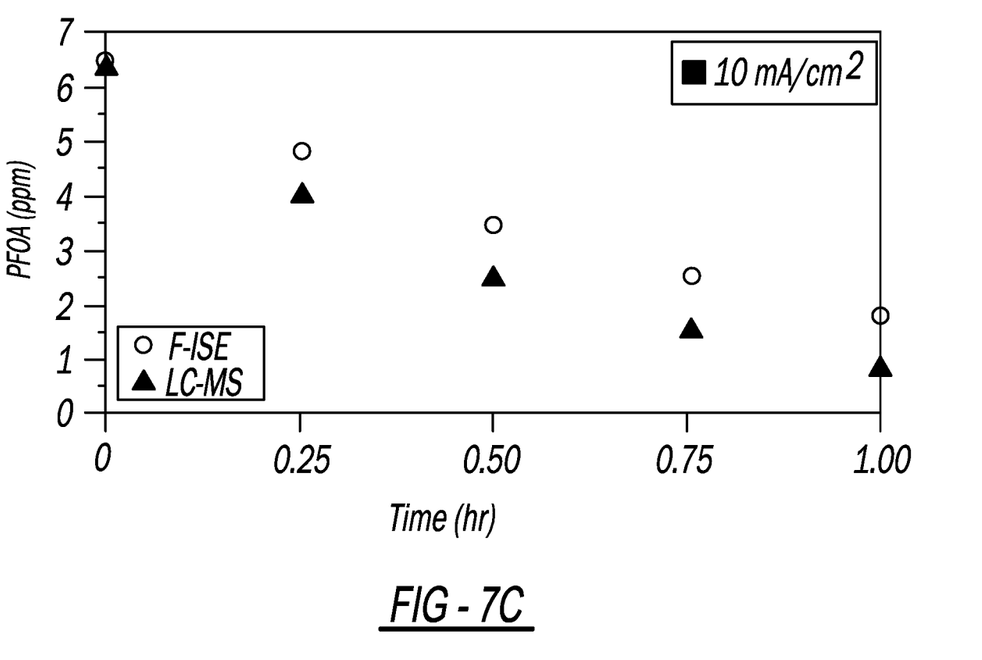
Figure 7D:
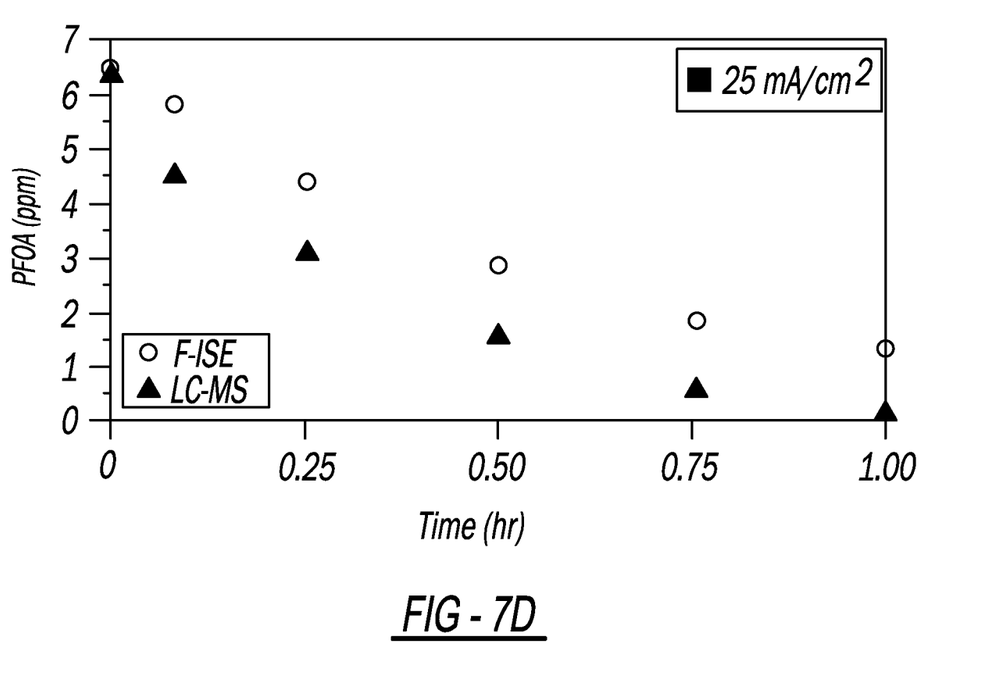
Figure 7E:
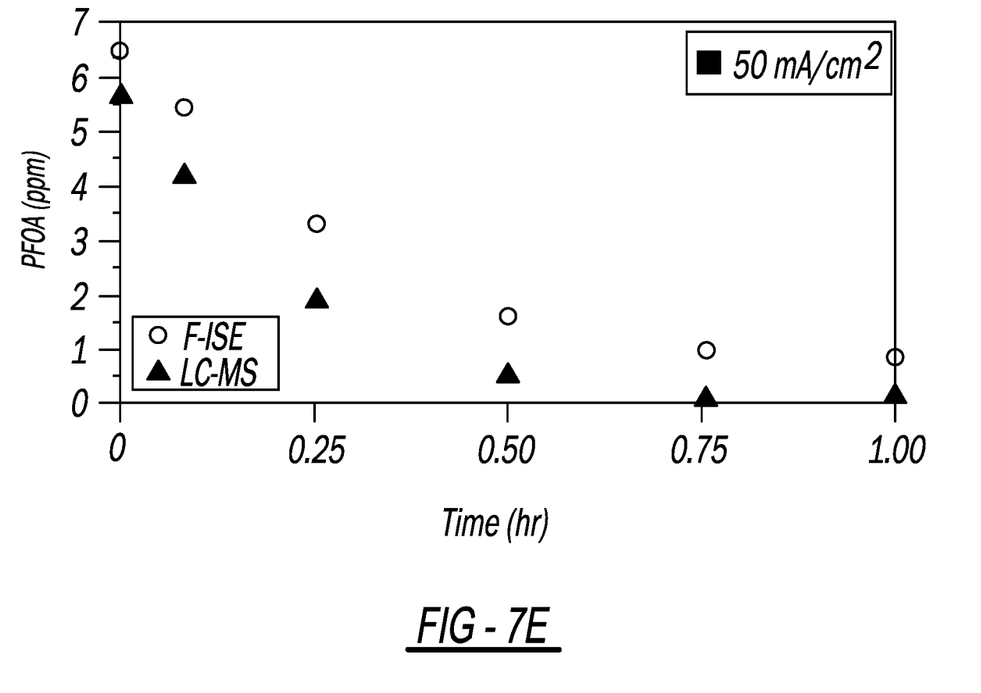
Figure 7F:
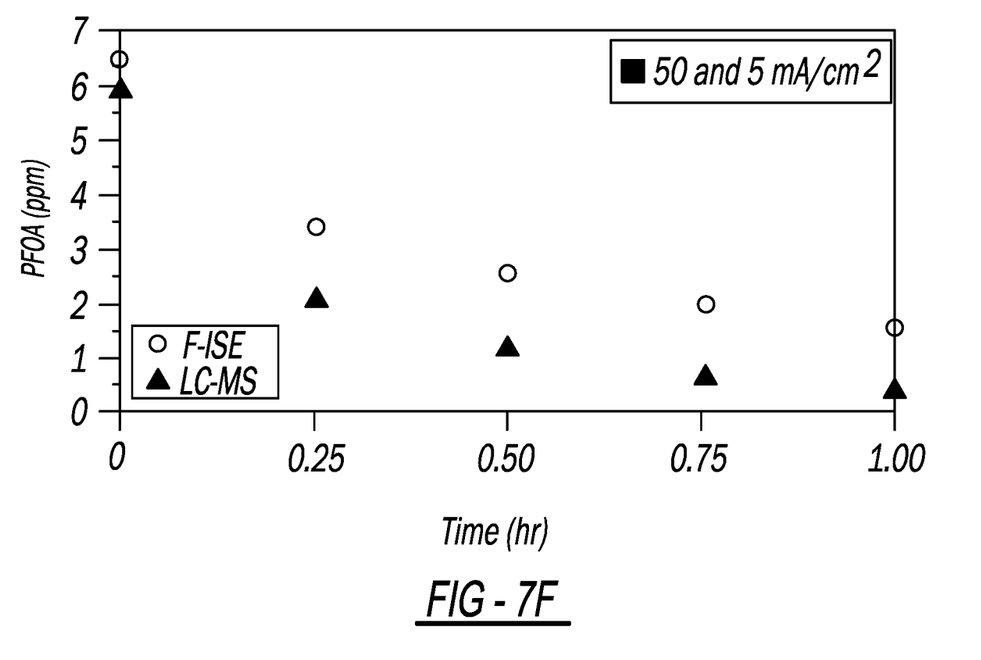

BDD is an efficient producer of hydrogen gas and therefore, an abundance of hydroxyl ions are generated at the cathode surface. Moreover, electrolysis using BDD increases the pH to 11 with an applied current of −8 μA. At the highest applied current, it is possible to increase the local pH by 5 units. The present mechanism may be different for an experiment performed at 1 mA/cm$^2$ that has a constant pH. FIG. 6 shows expected PFOA degradation for five standard CDs that is performed using the ISE. The illustrated general trend is expected where the concentration of PFOA decreases more rapidly with increasing CD.

Each CD study is fit to 1st order kinetics. Every CD except 50 mA/cm$^2$ has an average (n=3) linear coefficient of determination ($R^2$) greater than 0.99. 50 mA/cm$^2$ yielding an $R^2$ of 0.96. The following Table 1 shows average 1st order rate constants ($k_o$) expected for each CD study. The $k_o$ value increases as the CD increases. From FIG. 6, it appears that the slopes of the lines from the change in PFOA over time for each differ during the time of 0 to 0.25 hour; −2.8±0.3 ppm/h for 1 mA/cm$^2$ and increasing to −13.1±0.7 ppm/h for 50 mA/cm$^2$. After the 0.25-hour sample point, the CD studies of 5 mA/cm$^2$ and greater are expected to have a similar slope for PFOA removal over time. The slope at 5 and 10 mA/cm$^2$ during this time frame are expected to be −3.5±0.2 and −3.8±0.3 ppm/hour, respectively. This suggests that the higher applied current is only beneficial in the first 0.25 hour of the PFOA degradation process when using this experimental setup.

TABLE 1

Figures of merit for the standard CD studies, concentrations based on ISE.

| Current Density (mA/cm$^2$) | Average PFOA $k_o$ (h$^{-1}$) | Average linear fit for $k_o$ | Average PFOA remaining (ppm) |
| --- | --- | --- | --- |
| 1 | 0.44 ± 0.1 | 0.9981 | 4.3 ± 0.2 |
| 5 | 0.94 ± 0.1 | 0.9995 | 2.6 ± 0.2 |
| 10 | 1.24 ± 0.2 | 0.9979 | 2.0 ± 0.3 |
| 25 | 1.69 ± 0.3 | 0.9938 | 1.4 ± 0.5 |
| 50 | 2.25 ± 0.3 | 0.9669 | 0.9 ± 0.2 |

This is further supported by expected mixed CD studies of FIG. 6 where 50 mA/cm$^2$ is applied for the first 0.25 hour, then either 1, 5, or 10 mA/cm$^2$ is applied for the remaining time. The batch volume starts at room temperature and has a pH of ~5.0. During the high CD application, both the temperature and pH rise to a pH of 10.5 and roughly 30° C. at the end of 0.25 hour. When the current is lowered, both values stabilize out and decrease in value. The voltage of each cell is between +8.5 and +9 V for the first 0.25 hours, and then decreases to around +4, +5 and +5.6 V for 1, 5, and 10 mA/cm$^2$, respectively. FIG. 6 shows the expected change in PFOA determined from a fluoride ISE analysis for mixed CD compared to just 50 mA/cm$^2$.

The PFOA concentration values should begin to differ at each time point once the CD is lowered. The combination of 50 mA/cm$^2$ and 1 mA/cm$^2$ (50&1) provides the least degradation of PFOA. 50-5 and 50-10 should yield similar degradation rates and final PFOA concentrations. The 1st order rate constants for the whole hour will not have linear fits above 0.97.

The combined CD results should be fit to a sequential 1st order model. The 1st order rate constant for the first 0.25 hour, $k_1$, and that for the remaining time of 0.25 to 1 h, $k_2$, are determined. The average $k_1$ for the first 0.25 hour of all mixed CD runs are expected to be around 2.4±0.3 hour$^{-1}$. This should be a similar value as an obtained rate constant for the solo run of 50 mA/cm$^2$, 2.3±0.3 hour$^{-1}$. $k_2$ is examined to determine if it changes when starting with a lower concentration (after 0.25 hour of degradation at 50 mA/cm$^2$). These expected values are shown in Table 2 below. All these rate constants exhibit good linearity with $R^2$ greater than 0.98. They are similar to $k_0$ that should be obtained for the individual CD studies (Table 1).

TABLE 2

Figures of merit for the mixed CD studies, concentrations based on ISE.

| Current Density (mA/cm$^2$) | Average PFOA $k_1$ (h$^{-1}$) | Average PFOA $k_2$ (h$^{-1}$) | Average PFOA remaining (ppm) |
|---|---|---|---|
| 50 & 1 | 2.51 ± 0.2 | 0.51 ± 0.1 | 2.39 ± 0.1 |
| 50 & 5 | 2.58 ± 0.4 | 1.15 ± 0.3 | 1.55 ± 0.4 |
| 50 & 10 | 2.08 ± 0.3 | 1.11 ± 0.1 | 1.71 ± 0.1 |

Overall, 50-5 is chosen over 50-10 to degrade PFOA if utilizing the present mixed CD apparatus. 50-5 has the highest $k_1$ and $k_2$ values. 50-5 has a larger standard deviation in its rate constants compared to 50-10 but obtains roughly 0.16 ppm lower remaining of PFOA after 1 hour. 50-5 should have slightly higher PFOA remaining compared to 25 mA/cm$^2$ but 9 kW/m$^3$ lower energy; suggesting that instead of running 25 mA/cm$^2$, 50-5 could be more economical. Therefore, lowering the CD after the first 0.25 hour will obtain similar results as applying the higher CD for the whole test in this experimental setup.

To determine if shorter-chain PFAS are being formed, liquid chromatography-mass spectroscopy ("LC-MS") measurements may be used. The ISE measures free F$^-$ as an indirect method of PFOA concentration while LC-MS directly measures the actual PFOA concentration. As such, utilizing the LC-MS analysis can provide insight into generation and presence of shorter-chain PFCAs in the wastewater, thereby causing the controller to automatically vary the CD electrical characteristics.

FIGS. 7A-F show each standard CD and the 50-5 mixed CD run's PFOA average (n=3) concentration that may be determined by fluoride ISE compared to the results obtained using LC-MS. For 1 mA/cm$^2$, the PFOA concentrations from both methods are expected to be the same. This suggests that all the free F− measured will come from PFOA being directly mineralized. For the higher expected CD values and the mixed CD, the ISE and LC-MS values have a 1 ppm or greater difference between them at a number of time points.

An alternate configuration of the present sensor and feedback control loop can be used to vary a characteristic associated with temperature and/or pH, in addition to or instead of the electrical current density. If a temperature characteristic is changed, then a heating element is activated and energized to heat the fluid flowing thereby. If pH is changed, then the controller will activate a valve to add a buffer solution (using an environmentally-friendly chemical not including a chloride salt) from a reservoir coupled to the present plumbing system.

While various features of the present invention have been disclosed, it should be appreciated that other variations can be employed. For example, other or additional types of plumbing or electrical components may be used although certain benefits may not be achieved. Furthermore, while the fluid preferably includes water, other fluids may be employed, although some advantages may not be realized. It should be appreciated that features of one embodiment may be interchanged with features of another embodiment in any combination and order, and the claims may be multiply dependent upon each other and in any combination. Variations are not to be regarded as a departure from the present disclosure and all such modifications are intended to fall within the scope and spirit of the present invention.

The invention claimed is:

1. An apparatus comprising:
   a fluid-carrying conduit;
   electrodes located within the conduit being adapted to contact waste fluid flowing therethrough;
   an electrical controller connected to the electrodes;
   a sensor connected to the controller being adapted to sense a chemical characteristic associated with contaminants in the fluid;
   the controller being adapted to automatically vary an electrical characteristic of at least one of the electrodes based at least in part on an input from the sensor due to the chemical characteristic detected during the fluid flowing past the electrodes;
   the electrical characteristic being adapted to cause the contaminants to be removed from the fluid;
   wherein at least two of the electrodes each comprise a middle section with holes spanning across a hollow fluid-flow path of the conduit;
   wherein at least some of the holes of a first of the at least two of the electrodes are laterally offset from at least some of the holes of a second of the at least two of the electrodes, to create a turbulent flow of the fluid therebetween; and
   wherein the sensor detects if a precursor molecule is present, and when the precursor molecule is present, software instructions in the controller will automatically vary the electrical characteristic supplied to at least one of the electrodes.

2. An apparatus comprising:
   a liquid-carrying conduit;
   electrodes located within the conduit being adapted to contact waste liquid flowing therethrough;
   an electrical controller connected to the electrodes;
   a sensor connected to the controller being adapted to sense a chemical characteristic associated with PFAS contaminants in the waste liquid;
   the controller being adapted to automatically vary an electrical characteristic of at least one of the electrodes based at least in part on an input from the sensor due to the chemical characteristic detected during the fluid flowing past the electrodes; and
   the electrical characteristic being adapted to cause the PFAS contaminants to be removed from the waste liquid;
   wherein:
   at least two of the electrodes each comprise a middle section with holes spanning across a hollow fluid-flow path of the conduit;

at least some of the holes of a first of the at least two of the electrodes are laterally offset from at least some of the holes of a second of the at least two of the electrodes, to create a turbulent flow of the waste liquid therebetween;
at least one of the electrodes comprises a Boron-doped diamond layer;
the electrical characteristic comprises an electrical current density increase or decrease after electricity is initially supplied to an anode of the electrodes; and
the sensor detects if a long-chain molecule is present, and when the long-chain molecule is present, software instructions in the controller will automatically increase the electrical current density for at least one removal cycle of the waste liquid and then decrease the electrical current density for a subsequent removal cycle of the waste liquid.

3. The apparatus of claim 1, wherein the electrical characteristic comprises an electrical current density increase or decrease after electricity is initially supplied to an anode of the electrode.

4. The apparatus of claim 1, wherein the software instructions in the controller periodically reversing polarity between the electrodes, after real-time performance detection in the reactor.

5. The apparatus of claim 1, wherein the sensor is a potentiometic measuring sensor.

6. The apparatus of claim 1, wherein the sensor is a fluoride ion selective electrode detector.

7. The apparatus of claim 1, wherein the sensor detects at least one of: pH, electrical conductivity, temperature or flow rate, of the fluid which includes water.

8. The apparatus of claim 1, wherein the electrodes destroy the contaminants.

9. The apparatus of claim 1, wherein the controller automatically varies at least one of: electrical conductivity, flow rate, temperature or pH, of the fluid to remove the contaminants depending on the input of the sensor.

10. The apparatus of claim 1, wherein the controller varies the characteristic, which is an amount of an electrical current density, depending on a concentration or species of the contaminants detected.

11. An apparatus of claim 1, comprising:
a fluid-carrying conduit;
electrodes located within the conduit being adapted to contact waste fluid flowing therethrough;
an electrical controller connected to the electrodes;
a sensor connected to the controller being adapted to sense a chemical characteristic associated with contaminants in the fluid;
the controller being adapted to automatically vary an electrical characteristic of at least one of the electrodes based at least in part on an input from the sensor due to the chemical characteristic detected during the fluid flowing past the electrodes;
the electrical characteristic being adapted to cause the contaminants to be removed from the fluid;
wherein the electrodes include a stacked sandwich of alternating and spaced apart cathodes and anodes each with a fluid flow hole therein, the cathodes and anodes span transversely across a flow path of the fluid; and
a buffer solution, using an environmentally-friendly chemical not including a chloride salt, is added to the fluid from a buffer reservoir.

12. The apparatus of claim 11, wherein:
at least two of the electrodes each comprise a middle section with holes spanning across a hollow fluid-flow path of the conduit;
at least some of the holes of a first of the at least two of the electrodes are laterally offset from at least some of the holes of a second of the at least two of the electrodes, to create a turbulent flow of the fluid therebetween; and
the sensor detects if a precursor molecule is present, and when the precursor molecule is present, software instructions in the controller will automatically vary the electrical characteristic supplied to at least one of the electrodes.

13. An apparatus comprising:
a conduit carrying water therethrough;
electrodes comprising a stacked sandwich of alternating and spaced apart cathodes and anodes each with a flow hole therein, the cathodes and anodes spanning transversely across a flow path of the conduit;
at least one of the electrodes comprising a flat metallic substrate with a Boron-doped diamond layer thereon;
an electrical controller connected to the electrodes, the electrical controller including non-transient memory within which is stored programmed software instructions, the instructions comprising an automated feedback control loop which changes electrical current density supplied to the electrodes;
the electrodes causing contaminants to be removed from the water;
a sensor connected to the controller and being adapted to sense a chemical characteristic associated with the contaminants in the water; and
the software instructions varying an electrical characteristic of at least one of the electrodes based at least in part on an input from the sensor due to the chemical characteristic detected during the water flowing through the flow holes in the electrodes.

14. The apparatus of claim 13, wherein the sensor is a pH probe or fluoride ion detector.

15. The apparatus of claim 13, wherein there are multiple of the flow holes in each of the electrodes, and at least some of the flow holes of the anodes are laterally offset from at least some of the holes of the cathodes, to create a turbulent flow of the water therebetween and the sensor is a fluid temperature or flow rate sensor.

16. The apparatus of claim 13, wherein the software comprises instructions increasing or decreasing the electrical current density after electricity is initially supplied to the anodes due at least in part to measured values of contaminants with the water, the contaminants include PFAS.

17. The apparatus of claim 13, further comprising a buffer solution, using an environmentally-friendly chemical not including a chloride salt, being added to the water from a buffer reservoir.

18. The apparatus of claim 13, wherein the controller automatically varies at least one of: electrical conductivity, flow rate, temperature or pH, of the water to remove the contaminants.

19. The apparatus of claim 13, further comprising:
a holding tank;
the contaminated water being fed into the holding tank;
a pump pumping the water from the holding tank to the electrodes along the conduit;
the water flowing multiple cycles through the same conduit and the same electrodes before the water, in a cleaned state, exits an outlet; and the sensor detecting if a long-chain molecule is present, and when the long-chain molecule is present, the software instructions automatically increasing electrical current density for at least one of the cycles and then decreasing the electrical current density for subsequent of the cycles.

20. An apparatus comprising:
a conduit;
electrodes contacting water flowing through the conduit;
at least one of the electrodes comprises a Boron-doped diamond layer;
a programmable controller connected to the electrodes;
at least one sensor connected to the controller sensing a chemical characteristic associated with contaminants in the water;
the controller automatically varying an electrical characteristic of at least one of the electrodes based at least in part on an input from the sensor due to the chemical characteristic detected during the water flowing past the electrodes;
the controller automatically varying at least one of: electrical conductivity, flow rate, temperature or pH, of the water to remove the contaminants depending on the input of the sensor; and
a buffer solution, using an environmentally-friendly chemical not including a chloride salt, being added to the water from a buffer reservoir.

21. The apparatus of claim 20, wherein:
at least two of the electrodes each comprise a middle section with holes spanning across a hollow fluid-flow path of the conduit;
at least some of the holes of a first of the at least two of the electrodes are laterally offset from at least some of the holes of a second of the at least two of the electrodes, to create a turbulent flow of the fluid therebetween.

22. The apparatus of claim 20, wherein the electrical characteristic comprises an electrical current density increase or decrease after electricity is initially supplied to an anode of the electrode.

23. The apparatus of claim 20, wherein the electrical characteristic comprises periodically reversing polarity between the electrodes as controlled by the software instructions.

24. The apparatus of claim 20, further comprising:
a holding tank;
the water, which is waste water, being fed into the holding tank;
a pump pumping the water from the holding tank to the electrodes along the conduit; and
the water flowing multiple cycles through the same conduit and the same electrodes before the water, in a cleaned state, exits an outlet.

25. The apparatus of claim 20, wherein:
the at least one sensor detects if a long-chain molecule is present in the water, and when the long-chain molecule is present, the software instructions automatically increase electrical current density and then decrease the electrical current density during the removal of the contaminants from the water; and
the at least one sensor detects if a precursor molecule is present in the water, and when the precursor molecule is present in the water, the software instructions automatically vary an electrical characteristic supplied to at least one of the electrodes.

26. The apparatus of claim 11, wherein:
the contaminant includes PFAS; and
the electrical characteristic comprises an electrical current density increase or decrease after electricity is initially supplied to an anode of the electrode.

* * * * *